United States Patent
McGavran et al.

(10) Patent No.: US 11,100,797 B2
(45) Date of Patent: Aug. 24, 2021

(54) TRAFFIC NOTIFICATIONS DURING NAVIGATION

(71) Applicant: Apple Inc., Cupertino, CA (US)

(72) Inventors: Christine B. McGavran, Pacifica, CA (US); Wesley Yue, Sunnyvale, CA (US); Christopher Y. Tremblay, San Jose, CA (US); Supratik Maitra, Sunnyvale, CA (US); Usama M. Hajj, San Francisco, CA (US); Brian Andrich, San Francisco, CA (US); Eric L. Grundstrom, Oakland, CA (US); J. Paul McCabe, San Jose, CA (US); Eric J. Albert, San Francisco, CA (US); Ameya A. Limaye, Sunnyvale, CA (US); Graydon Armstrong, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 14/869,682

(22) Filed: Sep. 29, 2015

(65) Prior Publication Data

US 2016/0358468 A1 Dec. 8, 2016

Related U.S. Application Data

(60) Provisional application No. 62/171,493, filed on Jun. 5, 2015.

(51) Int. Cl.
*G01C 21/34* (2006.01)
*G08G 1/0968* (2006.01)
(Continued)

(52) U.S. Cl.
CPC ... *G08G 1/096827* (2013.01); *G01C 21/3415* (2013.01); *G01C 21/3492* (2013.01);
(Continued)

(58) Field of Classification Search
CPC combination set(s) only.
See application file for complete search history.

(56) References Cited

U.S. PATENT DOCUMENTS 6,662,106 B2 12/2003 Evans
6,711,498 B1 3/2004 Lau et al.
(Continued)

FOREIGN PATENT DOCUMENTS

CN 1468423 A 1/2004
CN 1685379 A 10/2005
(Continued)

OTHER PUBLICATIONS

Daniel Patrascu, BMW Real-Time Traffic Information Explained-autoevolution, available online at<http://www.autoevolution.com/news/bmw-real-time-traffic-information-explained-30487.html>, Jan. 31, 2011, pp. 1-4. (Year: 2011).*
(Continued)

*Primary Examiner* — Maceeh Anwari
(74) *Attorney, Agent, or Firm* — Invoke

(57) ABSTRACT

Some embodiments of the invention provide a navigation application that uses a novel traffic notification scheme for providing traffic related notifications during a navigation presentation that is provided by a device. While providing a navigation presentation, the application iteratively monitors traffic conditions along the route. When traffic conditions meet a set of one or more threshold criteria, the application identifies a type of traffic notification that it should provide from several possible traffic notifications types. Next, without receiving any input from outside of the device, the application provides a traffic notification that is associated with the selected traffic notification type. In some embodiments, the traffic notification types include a notification (1) relating to traffic congestion along the current route, (2) relating to one or more faster routes that can replace the
(Continued)

current route, and (3) regarding a road closure or extreme delay along the current route.

18 Claims, 10 Drawing Sheets

(51) Int. Cl.
 *G01C 21/36* (2006.01)
 *G08G 1/0969* (2006.01)
(52) U.S. Cl.
 CPC ..... *G01C 21/3608* (2013.01); *G01C 21/3667* (2013.01); *G01C 21/3691* (2013.01); *G08G 1/0969* (2013.01); *G08G 1/096844* (2013.01)

(56) References Cited

U.S. PATENT DOCUMENTS

| | | | | |
|---|---|---|---|---|
| 9,437,107 | B2* | 9/2016 | Scofield | G01C 21/3492 |
| 2004/0034464 | A1 | 2/2004 | Yoshikawa et al. | |
| 2009/0312945 | A1 | 12/2009 | Sakamoto et al. | |
| 2010/0305849 | A1* | 12/2010 | Nirhamo | G01C 21/3635 |
| | | | | 701/467 |
| 2011/0320115 | A1 | 12/2011 | Nam et al. | |
| 2012/0303264 | A1* | 11/2012 | Su | G01C 21/3415 |
| | | | | 701/416 |
| 2012/0303265 | A1* | 11/2012 | Su | G01C 21/3697 |
| | | | | 701/419 |
| 2013/0162425 | A1 | 6/2013 | Raghunathan et al. | |
| 2013/0338914 | A1 | 12/2013 | Weiss | |
| 2014/0123062 | A1* | 5/2014 | Nguyen | G01C 21/3611 |
| | | | | 715/810 |
| 2015/0160025 | A1* | 6/2015 | Konig | G01C 21/3415 |
| | | | | 701/410 |
| 2015/0177010 | A1* | 6/2015 | Abramson | G01C 21/34 |
| | | | | 701/400 |
| 2015/0253144 | A1* | 9/2015 | Rau | G01C 21/3415 |
| | | | | 705/348 |

FOREIGN PATENT DOCUMENTS

| | | |
|---|---|---|
| CN | 1879008 A | 12/2006 |
| CN | 1892721 A | 1/2007 |
| CN | 101113900 A | 1/2008 |
| CN | 101501450 A | 8/2009 |
| CN | 102288194 A | 12/2011 |
| CN | 102298851 A | 12/2011 |
| CN | 102768805 A | 11/2012 |
| CN | 103547887 A | 1/2014 |
| CN | 104282167 A | 1/2015 |
| EP | 2341318 | 7/2011 |
| GB | 2412281 | 9/2005 |

OTHER PUBLICATIONS

BMW USA, "ConnectedDrive Advanced Real Time Traffic |BMW Genius How-To" available online at <https://youtu.be/EVY6O6GxGr4>, May 29, 2015. (Year: 2015).*
Fernandes, Leandro C., et al., "A Driving Assistance System for Navigation in Urban Environments," IBERAMIA 2010, LNAI 6433, Month Unknown, 2010, pp. 542-551, Springer-Verlag, Berlin Heidelberg, Germany.
PCT/US2016/035897, Jun. 3, 2016 (filing date), Apple Inc.
International Search Report and Written Opinion of PCT/US2016/035897, Oct. 4, 2016 (mailing date), Apple Inc.
Author Unknown, "Don't let traffic slow you down this Memorial Day", Google Maps, May 20, 2015, 10 pages, available at https://maps.googleblog.com/2015/05/dont-let-traffic-slow-you-down-this.html, May 2015.
Author Unknown, "Wave Tip #4—Voice alerts for hazards and police traps ahead", YouTube, 1 pages, available at https://www.youtube.com/watch?v=xrjllw4q5jE, Apr. 2016.
Daniel Patrascu, BMW Real-Time Traffic Information Explained-autoevolution, available online at <http://www.autoevolution.com/news/bmw-real-time-traffic-information-explained-30487.html>, Jan. 31, 2011, pp. 1-4.

* cited by examiner

TRAFFIC NOTIFICATIONS DURING NAVIGATION

BACKGROUND

With proliferation of mobile devices such as smartphones, users are enjoying numerous applications of numerous kinds that can be run on their devices. One popular type of such application is mapping and navigation applications that allow user to browse maps and get route directions. Despite their popularity, these mapping and navigation applications have shortcomings with their features that cause inconvenience to the users.

BRIEF SUMMARY

Some embodiments of the invention provide a navigation application that uses a novel traffic notification scheme for providing traffic related notifications during a navigation presentation that is provided by a device. During a navigation presentation, the application provides navigation instructions that specify navigation maneuvers at junctures along a route that the device traverses to a destination. While providing the navigation presentation, the application iteratively monitors traffic conditions along the route. When it detects a traffic condition that meets a set of one or more threshold criteria, the application identifies a type of traffic notification that it should provide from several possible traffic notifications types. Next, without receiving any input from outside of the device (e.g., without receiving an input from a user of the device), the application provides a traffic notification that is associated with the selected traffic notification type.

In different embodiments, the application uses different traffic notification types. For instance, in some embodiments, the traffic notification types include (1) a notification relating to traffic congestion (i.e., a traffic-congestion notification) along the current route, (2) a notification relating to one or more faster routes (i.e., a faster-route notification) that can replace the current route, and (3) a notification regarding a road closure or extreme delay (i.e., route-obstruction notification) along the current route.

In some embodiments, the application accompanies a route-obstruction notification with a notification that the application is now providing a new route to the destination. In some embodiments, the route-obstruction notification is only provided for a road closure due to construction, weather or accidents, while in other embodiments, the route-obstruction notification is also provided for extreme delays along a road on the current route (due to construction, weather, accidents, traffic, etc.). Also, in some embodiments, the application provides a route-obstruction notification at the start of the route navigation in order to explain why it is not providing a particular route that takes a particular road that is closed or has extreme delay. Other embodiments do not provide such route-obstruction notifications at the start of the route navigation, but rather provide such a notification dynamically in order to explain why a new route has been selected to replace a previously provided route.

In some embodiments, the application provides a faster-route notification with an option that when selected, directs the application to provide a faster route instead of the current route. The application in some embodiments provides the traffic-congestion notification when the traffic congestion meets a first threshold that requires a notification to be provided, but does not meet a second threshold that requires a new faster route to be provided. In other embodiments, however, the application provides the traffic-congestion notification only when it cannot identify a faster route that circumvents a detected traffic condition along the current route.

In different embodiments, the application provides the navigation instructions and/or traffic notifications differently. For instance, in some embodiments, the application can provide such instructions and notifications both through verbal prompts and through display (e.g., display on a display screen of the device or driven by the device). Also, in some embodiments, the application can receive user navigation input (e.g., to request a navigation presentation to a destination or to specify an action with respect to a traffic notification) through a voice user interface or a graphical user interface (GUI) of the device (e.g., a GUI displayed on the device's screen or on a screen driven by the device). In other embodiments, the application receives user input only through a GUI or only through a voice input interface. Also, in other embodiments, the application provides navigation instructions and/or traffic notifications only through verbal prompts or only through display.

In different embodiments, the application displays the traffic notifications differently during a navigation presentation. For example, in some embodiments, the application dynamically displays a traffic notification banner during the navigation presentation when it detects a traffic condition that needs to be identified. The traffic notification banner includes a text component that describes the detected traffic condition. In some embodiments, the traffic notification banner also includes a pictorial component that graphically illustrates a detected traffic condition. In these or other embodiments, the traffic notification banner also includes a GUI item that allows a user to perform an action with respect to the detected traffic condition. For instance, in some embodiments, the faster-route notification banner includes a GUI item that allows the user to direct the application to display the identified faster route instead of the current route.

In different embodiments, the navigation application displays the traffic notification banner in different locations with respect to the displayed navigation presentation. For example, in some embodiments, the navigation presentation includes (1) a two- or three-dimensional view of a region being navigated by the device, (2) a representation of the navigated route, (3) a representation (e.g., a puck) of the device, and (4) a navigation banner that provides navigation instructions. In some of these embodiments, the application displays the traffic notification banner above or below the navigation banner.

Also, in some embodiments, the application modifies the appearance of the traffic notification banner for the different types of traffic notification. For instance, the application in some embodiments uses different colors for the traffic notification banner in order to distinguish the different types of traffic notification (e.g., uses a red obstruction-notification banner, uses a blue faster-route notification banner, and uses a yellow traffic-congestion banner). In these or other embodiments, the application uses different stylized text, and/or uses different geometric shapes, for the different traffic notification banners.

Traffic notification banners are removed differently in different embodiments. In some embodiments, these banners can be removed through user action, such as user input (e.g., touch, gestures, keystroke, cursor input, etc.) to remove the banner or to perform an action associated with a banner (e.g., the selection of a faster route). Conjunctively, or alternatively, the navigation application in some embodiments removes a traffic-notification banner a time period after it first displays the banner. In some of these embodiments, the application adjusts this time period if it detects user input (e.g., user touch, etc.) with respect to the banner. Also, in some embodiments, the navigation application removes a banner when it determines that the banner is no longer relevant. For instance, after displaying a faster route notification, the navigation application in some embodiments removes this notification once it detects that the device is past the point that the current and faster routes diverge.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a navigation application that uses a novel traffic notification scheme for providing traffic related notifications during a navigation presentation that is provided by a device. During a navigation presentation, the application provides navigation instructions that specify navigation maneuvers at junctures along a route that the device traverses to a destination. While providing the navigation presentation, the application iteratively monitors traffic conditions along the route. When it detects a traffic condition that meets a set of one or more threshold criteria, the application identifies a type of traffic notification that it should provide from several possible traffic notifications types. Next, without receiving an input from outside of the device (e.g., without receiving an input from a user of the device), the application provides a traffic notification that is based on the selected traffic notification type.

In different embodiments, the application provides the navigation instructions and/or traffic notifications differently. For instance, in some embodiments, the application can provide such instructions and notifications both through verbal prompts and through display (e.g., display on a display screen of the device or driven by the device). Also, in some embodiments, the application can receive user navigation input (e.g., to request a navigation presentation to a destination or to specify an action with respect to a traffic notification) through a voice user interface or a graphical user interface (GUI) of the device (e.g., a GUI displayed on the device's screen or on a screen driven by the device). In other embodiments, the application receives user input only through a GUI or only through a voice input interface. Also, in other embodiments, the application provides navigation instructions and/or traffic notifications only through verbal prompts or only through display.

Figure 1:
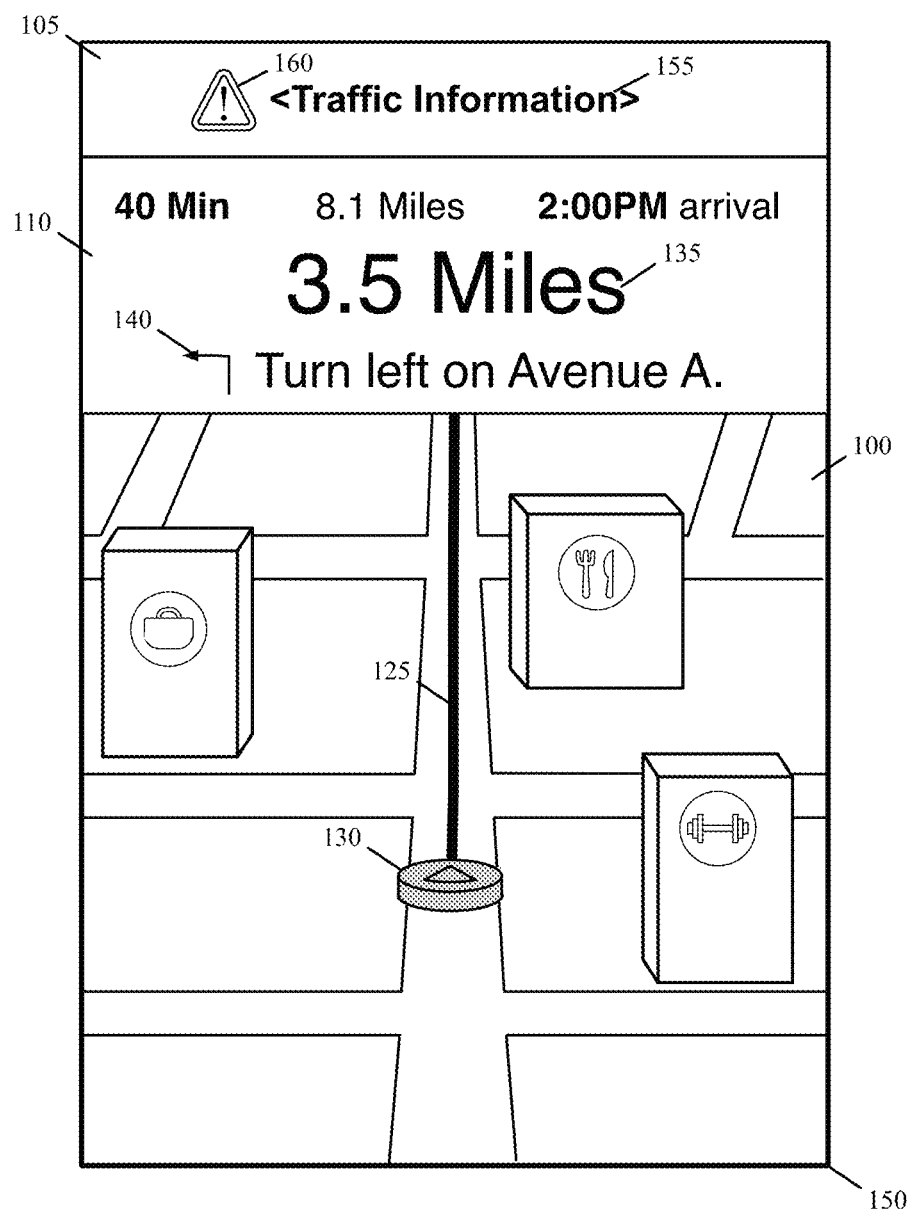
FIG. 1 illustrates one example of a dynamically presented traffic notification banner.

In different embodiments, the application displays the traffic notifications differently during a navigation presentation. For example, in some embodiments, the application dynamically displays a traffic notification banner during the navigation presentation when it detects a traffic condition that needs to be identified. FIG. 1 illustrates one example of such a dynamically presented traffic notification banner. In this example, the navigation application displays a traffic notification banner 105 above a navigation banner 110 that is displayed above or over a navigation presentation 100. In some embodiments, the navigation application executes on a handheld device (e.g., smartphone, tablet, etc.), or other computing device (e.g., laptop computer, vehicle navigation system, vehicle information display system, etc.) that has a display screen 150 on which application presents the navigation presentation 100. In other embodiments, the display screen 150 is part of another device (e.g., a vehicle's information display system) that is being driven by the handheld device or other computing device that executes the navigation application.

In the example illustrated in FIG. 1, the navigation presentation 100 includes a three-dimensional (3D) view of a region being navigated by the device. It also includes (1) a representation 125 of the navigated route, and (2) a representation 130 (called a puck) of the device that is traveling along the navigated route 125. It also includes the navigation banner 110, which provides navigation instructions regarding navigation maneuvers at junctures along the route. In some embodiments, the navigation application can also provide the navigation presentation with a two-dimensional view of the scene being navigated.

As shown, the navigation instruction in the navigation banner 110 includes a text component 135 that describes the distance to the next juncture and a description of the maneuver to perform at the juncture. It also includes a graphical component 140 that pictorially describes the maneuver at the next juncture. The navigation banner also includes in some embodiments information regarding the distance and time to the destination, and the expected time of arrival. In other embodiments, this information is provided outside of the navigation banner. Also, in some embodiments, the application sequentially provides in one navigation banner different navigation instructions for different navigation maneuvers that follow each other in a sequence. In other embodiments, the application displays different navigation banners for different maneuvers. In these embodiments, the application replaces a first navigation banner with a second navigation banner (e.g., has the first slide out while the second slides in) when the device passes the juncture associated with the maneuver of the first navigation banner.

The traffic notification banner 105 includes a text component 155 that describes the detected traffic condition. In some embodiments, the traffic notification banner also includes a pictorial component 160 that graphically illustrates a detected traffic condition. In these or other embodiments, the traffic notification banner may also include a GUI item that allows a user to perform an action with respect to the detected traffic condition. For instance, in some embodiments, the traffic notification banner includes a GUI item that allows the user to direct the application to display a faster route that is identified in the traffic notification banner in place of the route that is being currently displayed in the navigation presentation 100.

As mentioned above, the application in some embodiments provides different traffic notification types. For instance, in some embodiments, the traffic notification types include (1) a notification relating to traffic congestion (i.e., a traffic-congestion notification) along the current route, (2) a notification relating to one or more faster routes (i.e., a faster-route notification) that can replace the current route, and (3) a notification regarding a road closure or extreme delay (i.e., route-obstruction notification) along the current route.

In some embodiments, the application accompanies a route-obstruction notification with a notification that the application is now providing a new route to the destination. In some embodiments, the route-obstruction notification is only provided for a road closure due to construction, weather or accidents, while in other embodiments, the route-obstruction notification is also provided for extreme delays along a road on the current route (due to construction, weather, accidents, traffic, etc.). Also, in some embodiments, the application provides a route-obstruction notification at the start of the route navigation in order to explain why it is not providing a particular route that takes a particular road that is closed or has extreme delay. Other embodiments do not provide such route-obstruction notifications at the start of the route navigation, but rather provide such a notification dynamically in order to explain why a new route has been selected to replace a previously provided route.

As mentioned above, the application in some embodiments provides a faster-route notification with an option that when selected, directs the application to provide a faster route instead of the current route. The application in some embodiments provides the traffic-congestion notification when the traffic congestion meets a first threshold that requires a notification to be provided, but does not meet a second threshold that requires a new faster route to be provided. In other embodiments, however, the application provides the traffic-congestion notification only when it cannot identify a faster route that circumvents a detected traffic congestion along the current route.

In some embodiments, the navigation application provides different traffic notification banners for the different types of traffic notification. For instance, the application in some embodiments uses different colors for the traffic notification banner in order to distinguish the different types of traffic notification (e.g., uses a red obstruction-notification banner, uses a blue faster-route notification banner, and uses a yellow traffic-congestion banner). In these or other embodiments, the application uses different stylized text, and/or uses different geometric shapes, for the different traffic notification banners.

The navigation application removes the traffic notification banners 105 differently in different embodiments. In some embodiments, these banners can be removed through user action, such as user input (e.g., touch or gesture input on display screen 150, or keystroke or cursor input on the device, etc.) to remove the banner or to perform an action associated with a banner (e.g., the selection of a faster route). Conjunctively, or alternatively, the navigation application in some embodiments removes a traffic-notification banner a time period after it first displays the banner. In some of these embodiments, the application adjusts this time period if it detects user input (e.g., user touch, etc.) with respect to the banner. Also, in some embodiments, the navigation application removes a banner when it determines that the banner is no longer relevant. For instance, after displaying a faster route notification, the navigation application in some embodiments removes this notification once it detects that the device is past the point that the current and faster routes diverge.

Several more specific examples are provided below by reference to FIGS. 2-6 in order to show how some embodiments provide traffic-congestion notifications, faster-route notifications and route-obstruction notifications in traffic notification banners during the navigation presentation. In these examples, the navigation application executes on a handheld device with a touch-sensitive screen. One of ordinary skill will realize that these embodiments can also be implemented on other devices (e.g., devices without touch-sensitive screens or devices that are not handheld devices).

Figure 2:
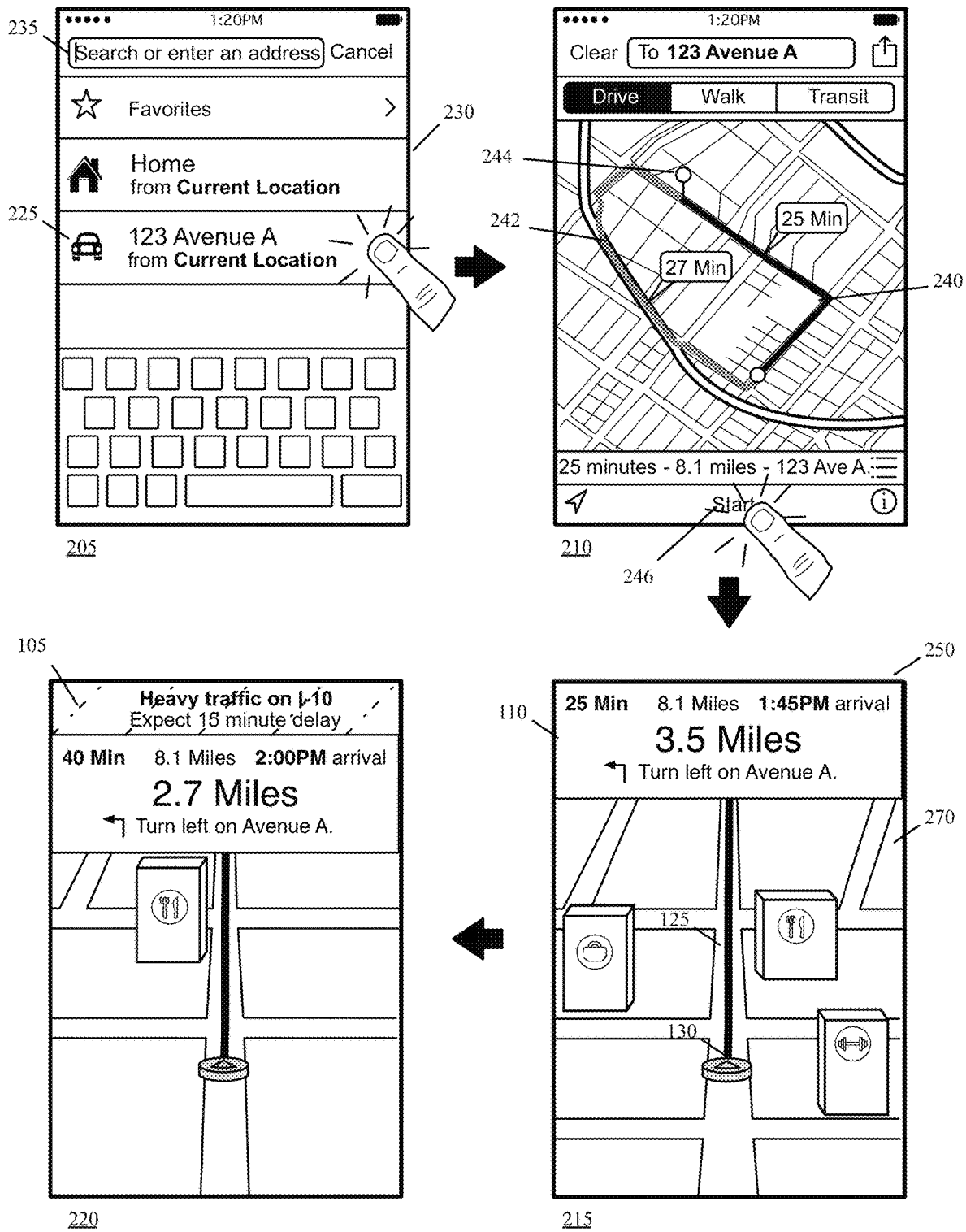
FIG. 2 illustrates an example of providing a traffic-congestion notification in the traffic notification banner.

FIG. 2 illustrates an example of providing a traffic-congestion notification in the traffic notification banner 105. This figures shows four operational stages 205-220 of the navigation application of some embodiments. The first operational stage 205 shows a user requesting the presentation of one or more routes form the current location of the device to a destination (which in this example is 123 Avenue A). The user makes this request by selecting the route-preview option 225 in a drop down list 230 that the user opens in some embodiments by tapping a search field 235. The navigation application in some embodiments provides several other mechanisms for a user to request route previews to particular destinations. These include one or more other controls for entering a destination and one or more controls for requesting route previews from a destination's placecard or point-of-interest banner. Some of these other mechanisms are further described in U.S. Patent Publication 2013/0345959.

The second operational stage 210 shows the navigation application displaying multiple possible routes 240 and 242 to the specified destination 244 (i.e., 123 Avenue A). One of these routes 240 is depicted in a different color or shading than the other route 242 in order to highlight that route 240 is the currently selected route. In some embodiments, the user can select the other route 242 by tapping on it.

The second operation stage 210 also shows the user selecting the Start option 246 to start a navigation presentation to the specified destination 244 along the currently selected route 240. In response to this selection, the navigation application presents the navigation presentation 250, as shown in the third stage 215. The navigation presentation 250 in this stage includes (1) a 3D view 270 of a region being navigated by the device, (2) a representation 125 of the navigated route, (3) a puck 130 to represent the device, and (4) a navigation banner 110 to provide navigation instructions regarding navigation maneuvers at junctures along the route.

In the third stage 215, the navigation presentation does not include any traffic notification banner because the navigation application has not detected a traffic condition for which it needs to provide a traffic notification. In some embodiments, the navigation application continuously monitors traffic conditions along the route to dynamically provide traffic notifications during a navigation presentation on an as-needed basis. As mentioned, the navigation application in some embodiments can provide a traffic-notification banner at the start of a navigation presentation to explain traffic along the navigated route and/or to explain why one or more roads are not going to be traversed in the navigated route (e.g., due to traffic, accidents, weather, closures, or other conditions).

The fourth stage 220 shows the navigation application presenting a traffic notification banner 105 to provide a traffic-congestion notification along the navigated route. The application provides this banner because it dynamically detects a traffic condition along the navigated route. In this example, the notification states that heavy traffic is to be expected along a portion of the route (which in this example is the I-10 freeway). It also states that a fifteen-minute delay should be expected.

The traffic-congestion notification can provide other information in some embodiments. For instance, when the navigation application can ascertain the cause of congestion, the traffic notification banner in some embodiments provides this cause in the traffic-congestion notification. Examples of such causes can include accidents, constructions, weather conditions, etc. When the cause for the delay can be associated with a specific location (e.g., to a location of an accident or start of construction), the traffic-congestion notification can also provide a distance to the specific locations (e.g., 800 yards to the accident). When the navigation application cannot ascertain the cause of the congestion, the traffic-congestion notification in some embodiments just specifies that delays should be expected. However, even in this situation, the traffic-congestion notification in some embodiments provides a distance to the location where the traffic starts to slow down.

The navigation application in some embodiments provides the traffic-congestion notification instead of a faster-route notification when the traffic congestion along the route meets a first threshold that requires a notification to be provided, but does not meet a second threshold that requires a new faster route to be provided. In other embodiments, however, the application provides the traffic-congestion notification only when it cannot identify a faster route that circumvents a detected traffic condition along the current route. In other words, in these embodiments, the navigation application always provides a faster-route notification when it detects a traffic condition that needs a notification, unless it cannot identify a faster route, in which case it provides a traffic-congestion notification.

The fourth stage 220 shows the traffic-notification banner with one set of cross hatching lines to indicate that this banner has a first appearance. This appearance is an appearance that the user is to associate with a traffic-congestion type of notification. As mentioned above, the navigation application modifies the appearance of the traffic notification banner for the different types of traffic notification. In some embodiments, the application colors the traffic notification banner yellow for traffic-congestion notifications, blue for faster-route notifications, and red for route-obstruction notifications. In other embodiments, the application uses different stylized text, and/or uses different geometric shapes, for the different traffic notification banners.

To dynamically detect traffic conditions, the navigation application in some embodiments accesses (through its device's network services and hardware) one or more traffic servers that provide traffic conditions for roads along the navigated route. In some embodiments, the navigation application also accesses one or more servers (again through its device's network services and hardware) to identify one or more routes between two locations (e.g., the device's current location and the device's specified destination). In some of these embodiments, the servers that provide the routes also provide the traffic condition data.

Figure 3:
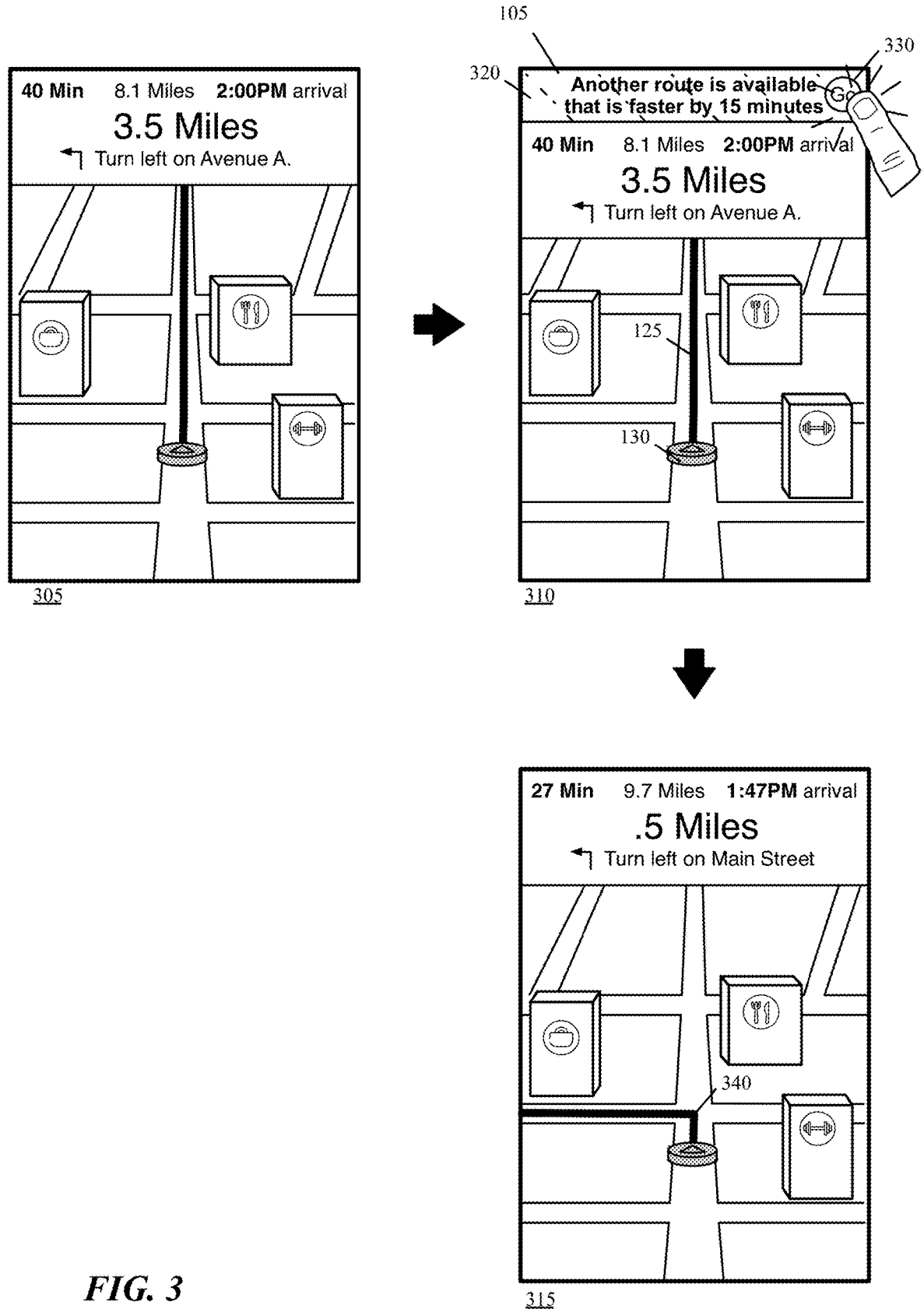
FIG. 3 illustrates an example of providing a faster-route notification in the traffic notification banner.

FIG. 3 illustrates an example of providing a faster-route notification in the traffic notification banner 105. This figures shows three operational stages 305-315 of the navigation application of some embodiments. The first operational stage 305 is identical to the third operational stage 215 of FIG. 2.

The second operational stage 310 shows the navigation application presenting the traffic notification banner 105 to provide a faster-route notification 320. The application provides this banner because it dynamically detects a traffic condition along the navigated route that is worse than a set of threshold criteria. The set of threshold criteria is different in different embodiments. In some embodiments, the threshold criteria set includes a condition that specifies that a faster route should be presented to a user when the current route has a delay of N minutes (e.g., 10 minutes) or more because of traffic conditions. In other embodiments, other threshold criteria are used. Also, in some embodiments, the faster route is not provided to the user when the user did not initially select this route and the current route does not have a delay that is worse than a particular amount (e.g., 15 minutes).

As shown in the second operation stage 310, the faster-route notification specifies that the application has found a faster route that is faster than the current route by a particular amount of time, which in this example is 15 minutes. The faster-route notification can provide other information in other embodiments. For instance, this notification in some embodiments provides some indication of the road or roads that the faster route will take (e.g., the notification can specify "Save 10 minutes by taking 280 instead of 101"). As shown, the traffic notification banner also includes a GUI item 330 that allows the user to direct the application to display the identified faster route instead of the current route.

The second stage 310 shows the traffic-notification banner with another set of cross hatching lines to indicate that this banner has a second appearance that differs from it appearance when it is just providing traffic conditions, as in FIG. 2. The appearance in FIG. 3 is an appearance that the user is to associate with a faster-route type of notifications. As mentioned above, the application colors the traffic notification banner blue when it is providing faster-route notifications.

The second stage 310 shows the user selecting the GUI item 330. As shown in the third stage 315, this selection causes the navigation to switch from the current navigated route 125 to the selected faster route 340. From this point on, the navigation presentation provides navigation maneuver instructions for directing the device along the selected faster route instead of the route it was previously presenting.

For the embodiments illustrated in FIG. 3, the navigation application identifies the faster route before providing the faster-route notification 320. This allows the navigation application to avoid having to perform a re-routing operation to identify the faster route after the user selects the faster-route control 330. In other embodiments, the navigation application provides the faster-route notification without having the faster-route already identified. For example, in some embodiments, the application obtains the duration of a faster route form an external route-generating server, presents the faster-route option to the user, and then only downloads the faster route when the user selects the faster-route option. In some of these embodiments, the application displays a "Re-Routing" feedback notification after the user selects the faster-route option until it can download the faster-route definition from the external server.

Figure 4:
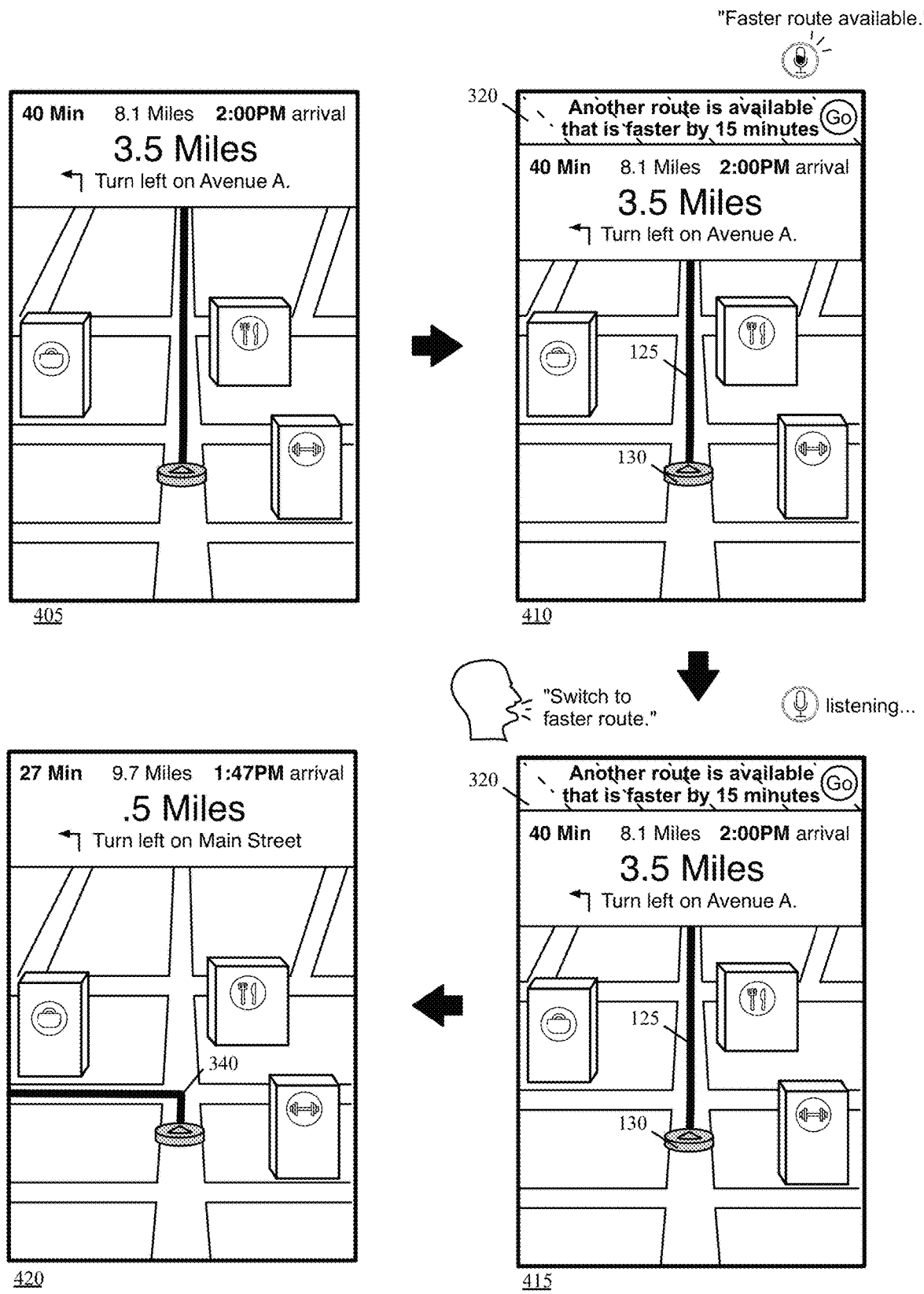
FIG. 4 illustrates an example of the navigation application of some embodiments providing traffic notifications through voice prompts.

As mentioned above, the navigation application of some embodiments provides the traffic notifications through voice prompts and allows the user to respond through voice commands. FIG. 4 illustrates an example of one such approach in terms of four operational stages 405-410. This example is similar to the example illustrated in FIG. 3, except that in FIG. 4, the navigation application not only presents the faster-route notification, but also provides a voice prompt that informs the user that it has found a faster route in the second stage 410. The first stage 405 in this example is identical to the first stage 305 of FIG. 3.

In the second stage 410, the voice prompt can provide different information in different embodiments. In some embodiments, the voice prompt provides an abbreviated version of the written notification in the traffic-notification banner that appears concurrently in the navigation presentation, as shown in the second stage 410 of FIG. 4. In other embodiments, the voice prompt contains the same information as the notification banner (e.g., is a read out version of the notification banner information).

After providing the voice prompt, the application can receive the user's feedback through voice command. To receive the user's voice command with respect to the prompt, the device's voice recognition module in some embodiments might be in a state to receive user voice input (e.g., might activate the device microphone to receive input and monitor the microphone's output) for a duration after providing the voice prompt without the user having to operate any physical input control's of the device. This is shown in the third stage 415 of FIG. 4, which illustrates the user directing the application to take the faster route. In other embodiments, the user has to choose to enable the device's input voice recognition module (e.g., by operating a physical input control of the device).

In some embodiments, the user can provide a variety of voice commands in response to the voice prompt regarding the detected traffic condition (e.g., regarding the availability of the faster route). Some of these embodiments allow the user to direct the navigation application to take the same action with respect to a traffic condition voice prompt through one of several different voice command options. Also, in some embodiments, different voice commands can direct the application to perform different actions (e.g., one command might direct the application to take the faster route, while another command might direct the application to ignore the faster route).

In some embodiments, the device has a contextual, voice recognition module (e.g., like Siri provided by Apple Inc.) to provide the traffic-notification voice prompts and to process the traffic-notification voice commands. Also, in some embodiments, the navigation application provides the traffic-notification voice prompts in lieu of the traffic-notification banners. In these embodiments, the navigation application (1) dynamically detects traffic conditions, (2) based on the detected traffic conditions and the available navigation re-routing options, selects one of several different traffic-notification voice prompts, and (3) presents the selected traffic-notification voice prompt.

The fourth stage 420 of FIG. 4 shows the navigation application taking the faster route 340 after receiving the user's voice command to take the faster route in the third stage 415. From this point on, the navigation presentation provides navigation maneuver instructions for directing the device along the selected faster route instead of the route it was previously presenting.

Figure 5:
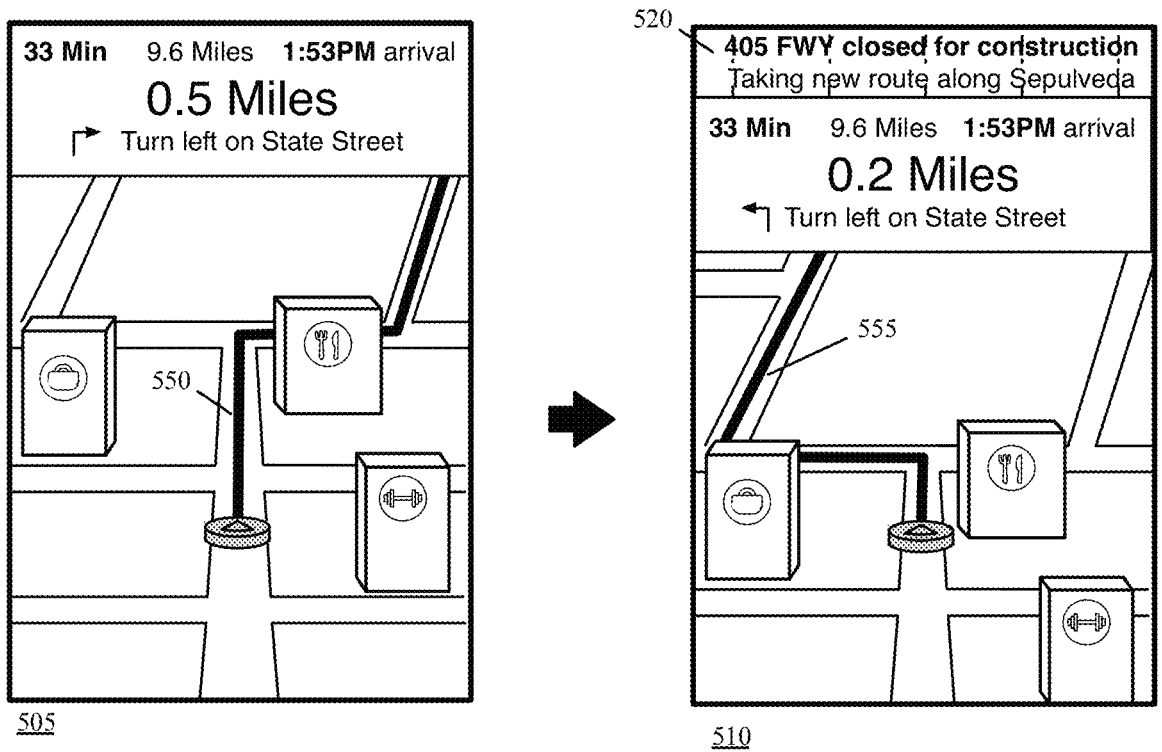
FIG. 5 illustrates an example of a route-obstruction notification of some embodiments.

FIG. 5 illustrates an example of a route-obstruction notification of some embodiments. This example is illustrated in terms of two operational stages 505 and 510 of the navigation application of some embodiments. In some embodiments, the navigation application continuously monitors traffic conditions along a navigated route. When it detects a road closure along the route, or an extreme traffic delay along the route (e.g., traffic congestion that delays the navigation by a particular threshold amount of time, such as 1 hour), the navigation application (1) identifies a new route for the device to navigate to the desired destination, (2) replaces the previous navigation presentation that was using the previously identified route with a new navigation presentation that uses the newly identified route, and then (3) provides a route-obstruction notification banner to describe the reason for switching to the newly identified route.

In FIG. 5, the first stage 505 illustrates a first navigation presentation that shows the device navigating along a first route 550 to a destination. This route takes the 405 freeway. After the first stage 505, the navigation application determines that the 405 freeway is closed for construction. Hence, it identifies a second route 555 to the destination that does not use the 405 freeway. In the second stage 510, the application then presents the second route 555 with the route-obstruction notification banner 520 that describes that the 405 freeway is closed for construction and a new route is being presented that takes Sepulveda.

One of ordinary skill will realize that in different embodiments the route-obstruction notification banner says different things. For instance, in some embodiments, the route-obstruction notification banner explains the nature of road closure (e.g., construction, heavy traffic congestion, etc.) and then simply states that the route has been updated without further explaining the new route. Also, the route-obstruction notification is only provided for a road closure due to construction, weather or accidents in some embodiments, while in other embodiments, the route-obstruction notification is also provided for extreme delays along a road on the current route (due to construction, weather, accidents, traffic, etc.).

The second stage 510 shows the traffic-notification banner with yet another set of cross hatching lines to indicate that this banner has a third appearance that differs from it appearance when it is providing traffic conditions or a faster route, as in FIGS. 2-4. The appearance in FIG. 5 is an appearance that the user is to associate with a route-obstruction notification. As mentioned above, the application colors the traffic notification banner red when it is providing route-obstruction notifications.

Figure 6:
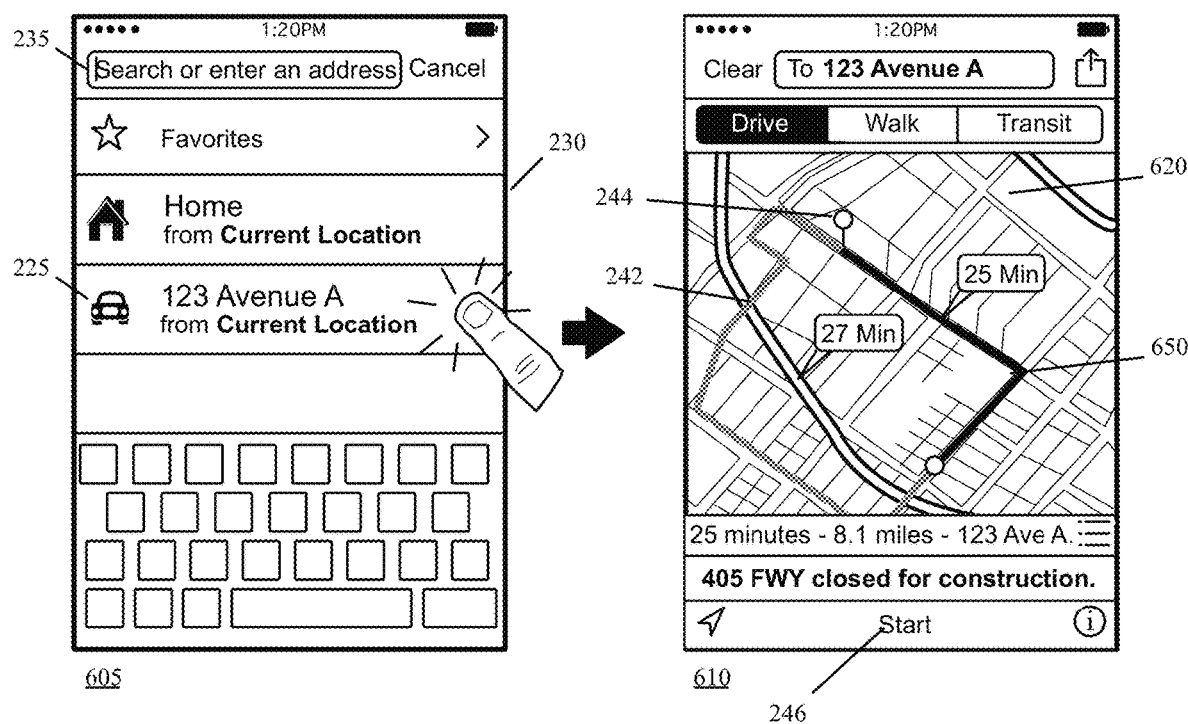
FIG. 6 illustrates a route-obstruction notification at the start of the route navigation in order to explain why it is not providing a particular route that takes a particular road that is closed or has extreme delay.

In some embodiments, the application provides a route-obstruction notification at the start of the route navigation in order to explain why it is not providing a particular route that takes a particular road that is closed or has extreme delay. FIG. 6 illustrates one such example. This example is illustrated in two operational stages 605 and 610 of the navigation application. The first operation stage 605 is similar to the first operational stage 205 of FIG. 2. In this stage 605, the user requests a route to a particular destination.

Multiple routes 242 and 650 can be taken to the particular destination. One of these routes involves taking the 405 freeway. However, the application determines that the 405 route cannot be taken as the 405 freeway is closed for construction. Hence, in the second stage 610, the navigation application displays, with the other identified routes, a notification that describes the closure of the 405 freeway. This notification is provided in case the user is wondering why one of the presented routes does not take this freeway.

As shown in the second stage 610, this notification is provided below the map 620 on which the overviews of the identified routes is presented. In other embodiments, this notification is provided in different locations. For example, this notification might be provided as a notification banner at the start of the navigation of one of the routes that is presented in the second stage 610 (e.g., after the Start control 246 is selected for one of the presented routes).

Figure 7:
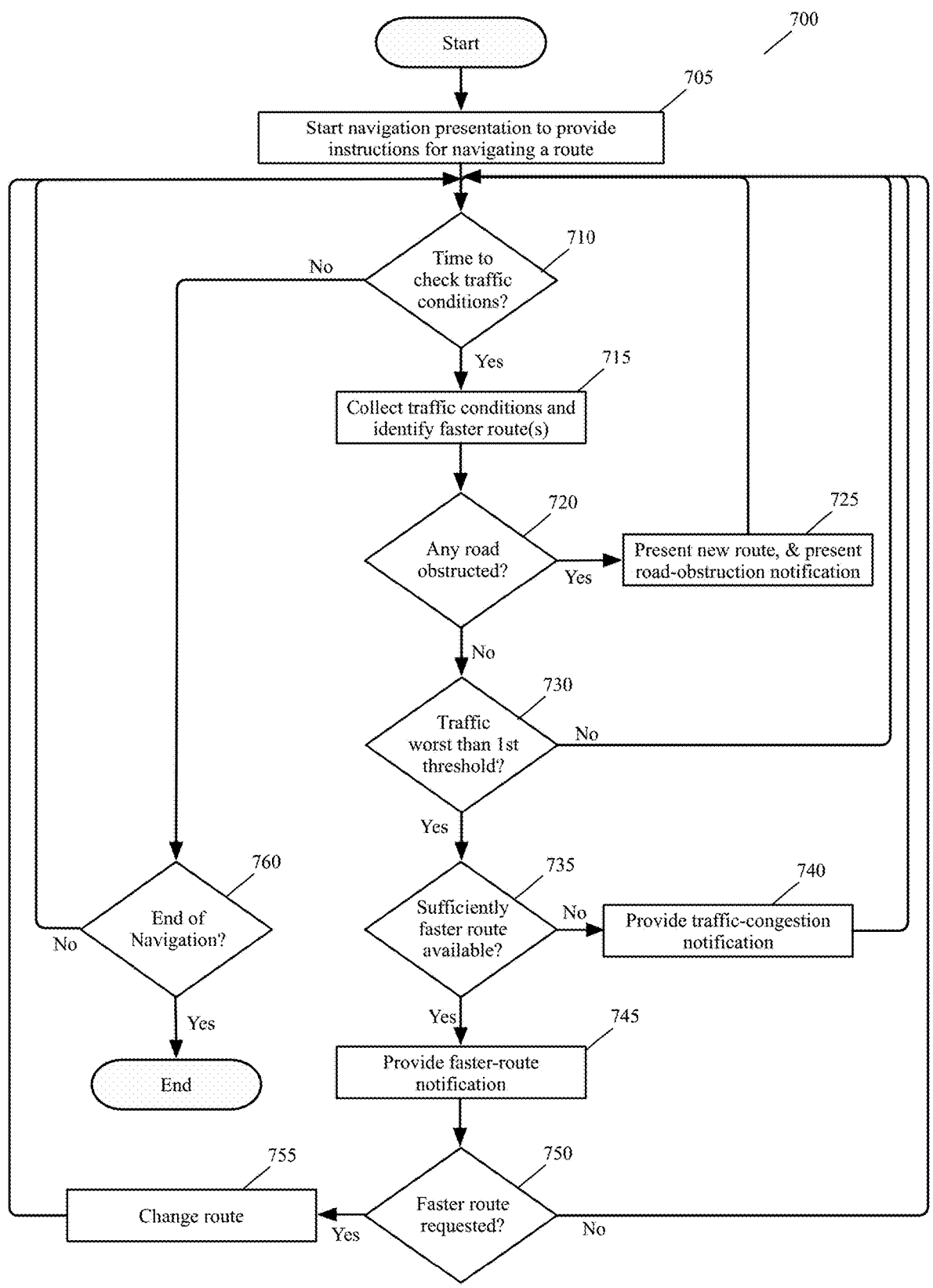
FIG. 7 conceptually illustrates a traffic notification process of some embodiments.

FIG. 7 conceptually illustrates a traffic notification process 700 of some embodiments. A navigation application that executes on a device that travels along a route performs this process in some embodiments. Also, in some embodiments, this process is a sub-process of a navigation process that provides a navigation presentation. In order not to obscure the description of the traffic notification process 700 with unnecessary detail, some of the operations of the navigation process are not illustrated in FIG. 7. For instance, the navigation process has to continuously identify the current location of the device, correlate this location with locations along the navigated route, and provide navigation instructions (e.g., navigation banners and/or voice instructions) to describe maneuvers at upcoming junctures along the route. The navigation process also has to perform re-routing operations if the device travels off the traversed route. These operations are not illustrated in FIG. 7 as they are not germane to the traffic notifications that the navigation application provides.

As shown, the process 700 starts (at 705) when the navigation application is directed (e.g., by a user) to deliver a navigation presentation for providing navigation instructions for navigating a route to a particular destination. At 710, the process determines whether it is time to check traffic conditions along the route. If not, the process transitions to 760, where it determines whether the navigation to the destination has ended (e.g., the device has reached the destination or the user has ended the navigation presentation). When the process determines (at 760) that the navigation presentation has ended, the process 700 ends. Otherwise, the process returns to 710 to determine whether it should check the traffic conditions.

When the process determines (at 710) that it should check the traffic conditions along the route, the process contacts (at 715) an external server through the device's network interface to collect the traffic conditions along the current route. In some embodiments, the process also directs (at 715) the external server or another server to identify one or more other routes to the destination. In some embodiments, the process 700 asks (at 715) only for routes that are faster than the current route, if any. In other embodiments, the process 700 asks (at 715) for one or more other routes, which may or may not be faster than the current route. Alternatively, in other embodiments, the process 700 does not ask for any other routes at 715. For instance, in some of these embodiments, the process 700 just asks (at 715) for traffic conditions along the current route. However, in some of these embodiments, the process requests (at 715) travel times along alternative routes without asking for these routes.

Based on the traffic information collected at 715, the process determines (at 720) whether any road obstructions exist along the current route. In some embodiments, road obstructions are road closures (i.e., one or more closed roads) along the current route. Road closures can be due to construction, weather, accidents, etc. In some embodiments, road obstructions also include extreme delay along one or more roads traversed by the current road.

When the process determines (at 720) that there is a road closure along the current route, the process (at 725) presents a new route to the destination and presents a road-closure notification to specify the reason for the new route and the nature of the road closure that necessitated abandoning the previous route. In some embodiments, the process obtained the new route at 715. In embodiments where the process does not obtain a new route at 715, the process requests (at 725) a new route from an external server (through the device's network interface) before presenting (at 725) this new route. In some embodiments, the process removes the road-closure notification after a delay, while in other embodiments, the process requires a user to request the removal of this road-closure notification (e.g., through a GUI input). After 725, the process returns to 710.

When the process determines (at 720) that there is no road closure along the current route, the process determines (at 730) whether the traffic conditions along the current route are worse than a first threshold. Traffic conditions and traffic thresholds are defined differently in different embodiments. In some embodiments, these parameters are defined in terms of traffic congestion times that express extra travel time due to traffic conditions along one or more roads traveled along the route.

In some embodiments, the process assesses (at 730) whether the traffic condition is worst than a first threshold (e.g., whether the traffic condition is adding at least 5 minutes of delay to the travel time), because the process is designed not to interrupt the navigation presentation for minor traffic delays along the route. When the process 700 determines (at 730) that the traffic condition is not worst than the first threshold, the process returns to 710. Otherwise, the process transitions to 735.

At 735, the process determines whether a sufficiently faster route is available to the destination that does not have the traffic delay of the current route. In some embodiments, the process obtained the new route at 715, and assesses (at 735) whether this newly obtained route is faster than the current route by a requisite amount (e.g., faster by 10 minutes). In embodiments where the process does not obtain a new route at 715, the process assesses (at 735) the traffic conditions collected at 715, and if traffic conditions are worse than the first threshold amount, asks (at 735) the server to identify a faster route, if possible.

When the process determines (at 735) that another route is not available that is faster than the current route by a requisite amount (e.g., faster by 10 minutes), the process 700 provides (at 740) a traffic-congestion notification to identify the traffic congestion along the current route, and then returns to 710. In some embodiments, the process 700 does not provide notification regarding any new route if none of the new routes are faster than the current route by at least the requisite amount, because in these embodiments, the traffic notification process is designed not to suggest a faster route unless it is sufficiently faster than the current route. Other embodiments, however, do not require the new routes to be sufficiently faster than the current route, before providing notifications about them.

When the process determines (at 735) that a sufficiently faster route exists, the process provides (at 745) a faster-route notification banner. The process then determines (at 750) whether the user requested the faster route. If not, the process returns to 710. On the other hand, when the user requests the faster route, the process (at 755) removes the current route from the navigation presentation and provides a new faster route in the navigation presentation with instructions for navigating this newer route. As mentioned above, the process obtains the definition of this route at 715 in some embodiments. In the embodiments where the process does not obtain a new route at 715, the process obtains the definition of this route at 745 or 755, from an external server (through the device's network interface). After 755, the process returns to 710.

One of ordinary skill will realize the process 700 is simply conceptual illustration of some of the operations that the navigation application performs in some embodiments. These operations can be performed in different orders or by different processes in some embodiments. Also, other embodiments may not include all of these operations or might include other operations. For instance, before presenting a faster route, the traffic notification process of some embodiments ensures that the traffic conditions along the current route are not only worse than a first threshold amount, but also are higher than a second higher threshold amount, in order to ensure that new route notifications are not provided for less significant delays along the route.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
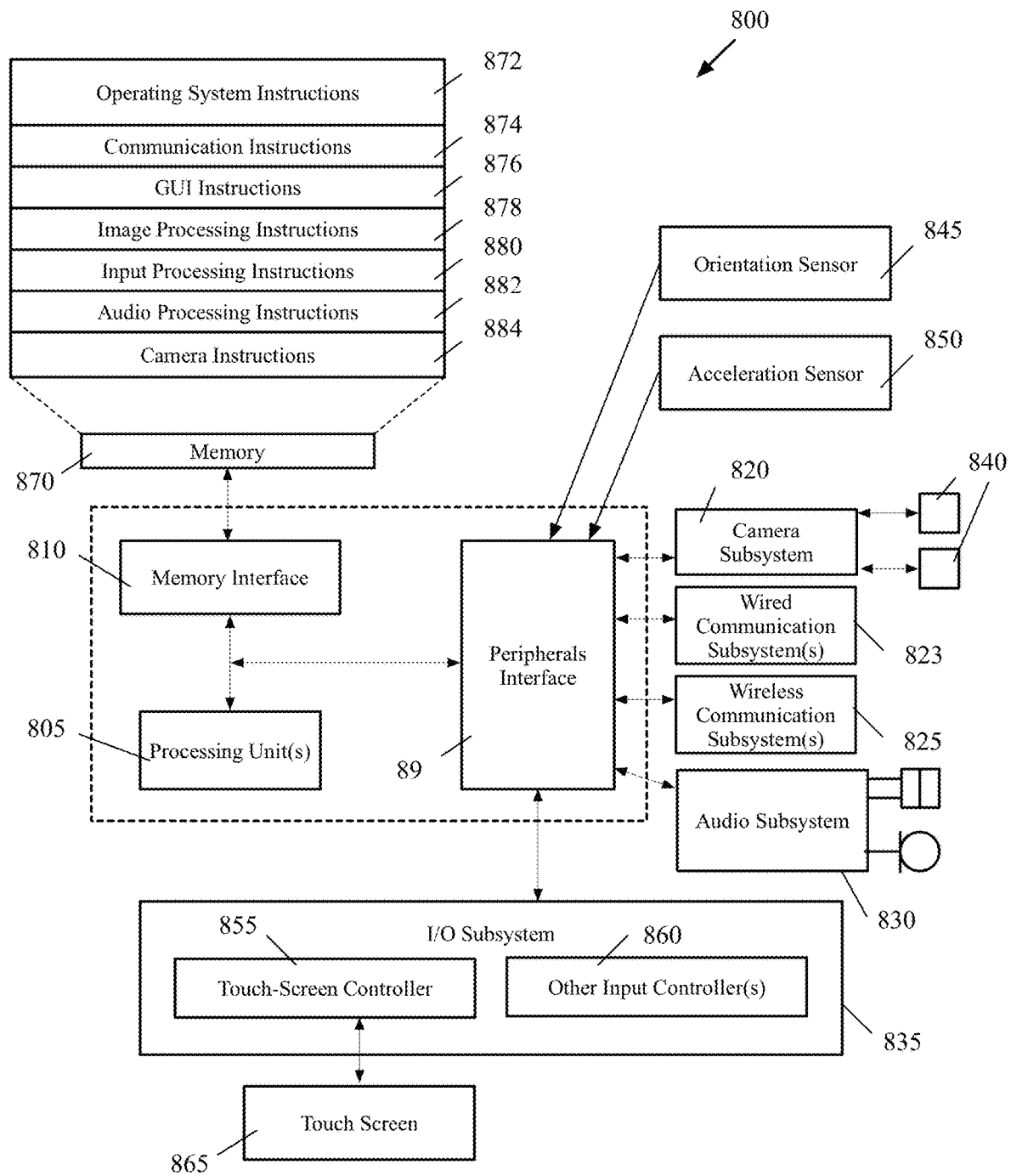
FIG. 8 is an example of an architecture of a mobile computing device.

The applications of some embodiments operate on mobile devices, such as smart phones (e.g., iPhones®) and tablets (e.g., iPads®). FIG. 8 is an example of an architecture 800 of such a mobile computing device. Examples of mobile computing devices include smartphones, tablets, laptops, etc. As shown, the mobile computing device 800 includes one or more processing units 805, a memory interface 810 and a peripherals interface 815.

The peripherals interface 815 is coupled to various sensors and subsystems, including a camera subsystem 820, a wireless communication subsystem(s) 825, an audio subsystem 830, an I/O subsystem 835, etc. The peripherals interface 815 enables communication between the processing units 805 and various peripherals. For example, an orientation sensor 845 (e.g., a gyroscope) and an acceleration sensor 850 (e.g., an accelerometer) is coupled to the peripherals interface 815 to facilitate orientation and acceleration functions.

The camera subsystem 820 is coupled to one or more optical sensors 840 (e.g., a charged coupled device (CCD) optical sensor, a complementary metal-oxide-semiconductor (CMOS) optical sensor, etc.). The camera subsystem 820 coupled with the optical sensors 840 facilitates camera functions, such as image and/or video data capturing. The wireless communication subsystem 825 serves to facilitate communication functions. In some embodiments, the wireless communication subsystem 825 includes radio frequency receivers and transmitters, and optical receivers and transmitters (not shown in FIG. 8). These receivers and transmitters of some embodiments are implemented to operate over one or more communication networks such as a GSM network, a Wi-Fi network, a Bluetooth network, etc. The audio subsystem 830 is coupled to a speaker to output audio (e.g., to output voice navigation instructions). Additionally, the audio subsystem 830 is coupled to a microphone to facilitate voice-enabled functions, such as voice recognition (e.g., for searching), digital recording, etc.

The I/O subsystem 835 involves the transfer between input/output peripheral devices, such as a display, a touch screen, etc., and the data bus of the processing units 805 through the peripherals interface 815. The I/O subsystem 835 includes a touch-screen controller 855 and other input controllers 860 to facilitate the transfer between input/output peripheral devices and the data bus of the processing units 805. As shown, the touch-screen controller 855 is coupled to a touch screen 865. The touch-screen controller 855 detects contact and movement on the touch screen 865 using any of multiple touch sensitivity technologies. The other input controllers 860 are coupled to other input/control devices, such as one or more buttons. Some embodiments include a near-touch sensitive screen and a corresponding controller that can detect near-touch interactions instead of or in addition to touch interactions.

The memory interface 810 is coupled to memory 870. In some embodiments, the memory 870 includes volatile memory (e.g., high-speed random access memory), non-volatile memory (e.g., flash memory), a combination of volatile and non-volatile memory, and/or any other type of memory. As illustrated in FIG. 8, the memory 870 stores an operating system (OS) 872. The OS 872 includes instructions for handling basic system services and for performing hardware dependent tasks.

The memory 870 also includes communication instructions 874 to facilitate communicating with one or more additional devices; graphical user interface instructions 876 to facilitate graphic user interface processing; image processing instructions 878 to facilitate image-related processing and functions; input processing instructions 880 to facilitate input-related (e.g., touch input) processes and functions; audio processing instructions 882 to facilitate audio-related processes and functions; and camera instructions 884 to facilitate camera-related processes and functions. The instructions described above are merely exemplary and the memory 870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

Figure 9:
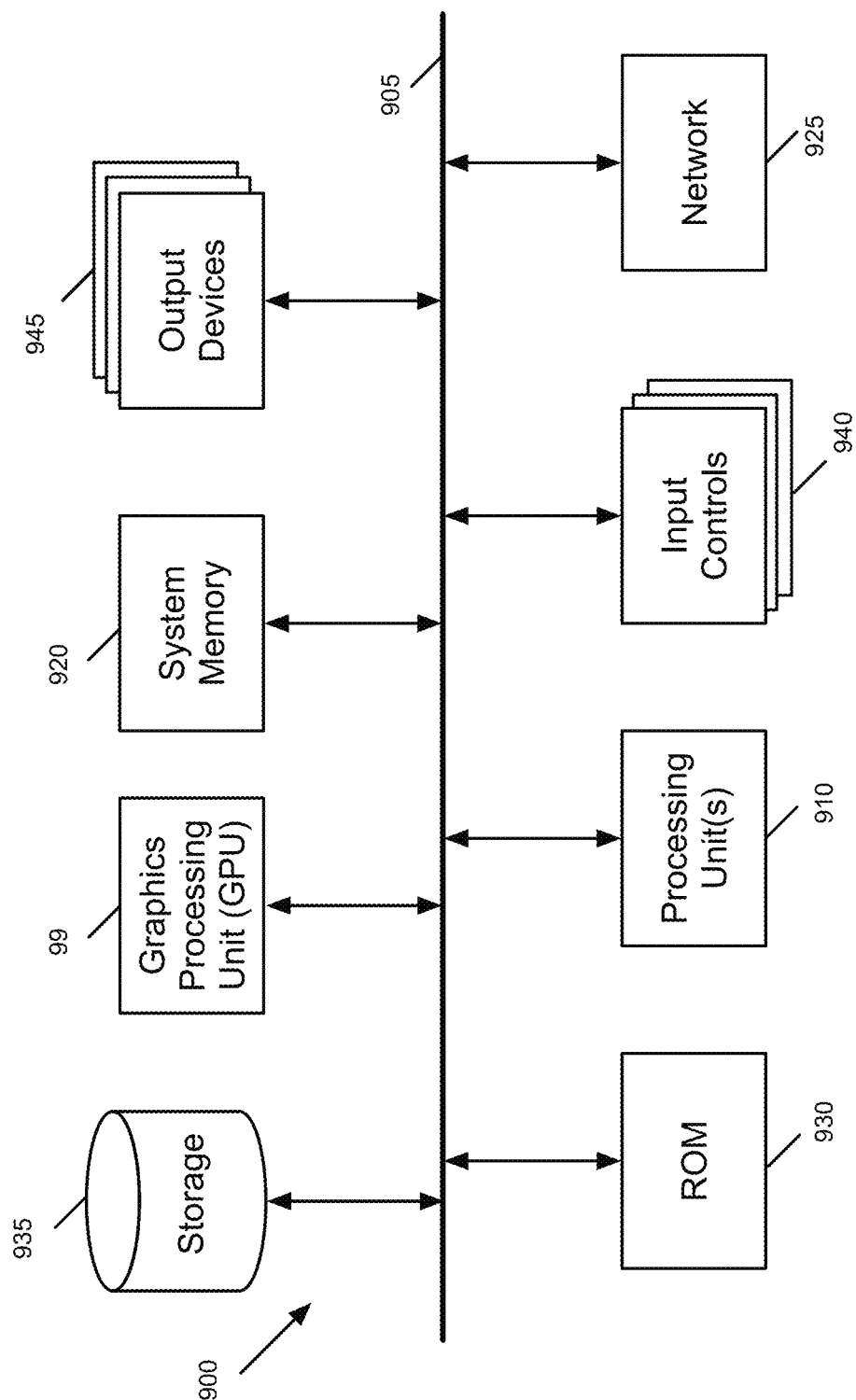
FIG. 9 conceptually illustrates another example of an electronic system with which some embodiments of the invention are implemented.

FIG. 9 conceptually illustrates another example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 910, a graphics processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935.

Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 10:
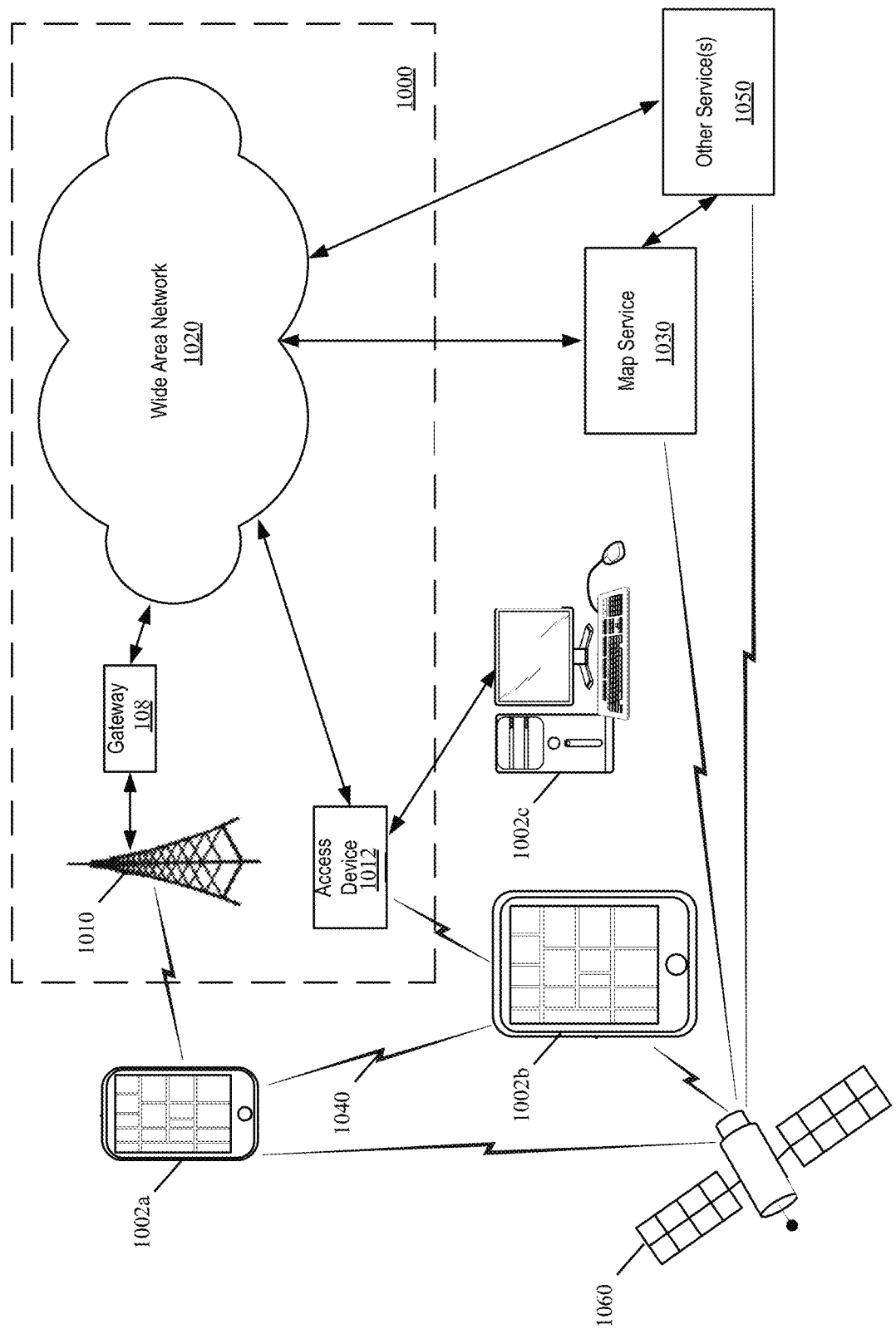
FIG. 10 illustrates one possible embodiment of an operating environment for a map service and client devices.

Various embodiments may operate within a map service operating environment. FIG. 10 illustrates one possible embodiment of an operating environment 1000 for a map service (also referred to as a mapping service) 1030 and client devices 1002a-1002c. In some embodiments, devices 1002a, 1002b, and 1002c communicate over one or more wired or wireless networks 1010. For example, wireless network 1010, such as a cellular network, can communicate with a wide area network (WAN) 1020, such as the Internet, by use of gateway 1014. A gateway 1014 in some embodiments provides a packet oriented mobile data service, such as General Packet Radio Service (GPRS), or other mobile data service allowing wireless networks to transmit data to other networks, such as wide area network 1020. Likewise, access device 1012 (e.g., IEEE 802.11g wireless access device) provides communication access to WAN 1020.

The client devices 1002a and 1002b can be any portable electronic or computing device capable of communicating with a map service (e.g., smart phone, tablet, laptop computer, etc.). Device 1002c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1002a-1002c are not shown as each accessing the map service 1030 via either the wireless network 1010 and gateway 1014 or the access device 1012, one of ordinary skill in the art will recognize that the client devices of some embodiments may access the map service via multiple different wired and/or wireless protocols.

Devices 1002a-1002c can also establish communications by other means. For example, these devices may communicate with other wireless devices (e.g., other devices 1002b, cell phones, etc.) over the wireless network 1010 or through access device 1012. Likewise the devices 1002a-1002c can establish peer-to-peer communications 1040 (e.g., a personal area network) by use of one or more communication subsystems, such as Bluetooth® communication or similar peer-to-peer protocols.

Devices 1002a-1002c may also receive Global Positioning Satellite (GPS) signals from GPS satellites 1060. In addition, in some embodiments the map service 1030 and other services 1050 may also receive GPS signals from GPS satellites 1060.

A map service 1030 may provide map services for one or more client devices 1002a-1002c in communication with the map service 1030 through various communication methods and protocols. A map service 1030 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1002a-1002c may utilize these map services to obtain the various map service data, then implement various techniques to process the data and provide the processed data to various entities (e.g., internal software or hardware modules, display screens of the client devices, external display screens, or other external systems or devices.

The map service 1030 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1002a-1002c, the map service 1030 of some embodiments, performs various optimization techniques to analyze a map tile before encoding the tile.

In some embodiments, the map tiles are generated by the map service 1030 for different possible display resolutions at the client devices 1002a-1002c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1030 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1030 responds to requests from the client devices 1002a-1002c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1002a-1002c that obtain map service data from the map service 1030 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1002a-1002c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1030. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1002a-1002c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1030 and/or other service(s) 1050 are configured to process search requests from any of the client devices. Search requests may include but are not limited to queries for businesses, addresses, residential locations, points of interest, or some combination thereof. Map service 1030 and/or other service(s) 1050 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1030 and/or other service(s) 1050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1030 and/or other service(s) 1050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1030 and/or other service(s) 1050 provide one or more feedback mechanisms to receive feedback from client devices 1002a-1002c. For instance, client devices may provide feedback on search results to map service 1030 and/or other service(s) 1050 (e.g., feedback specifying ratings, reviews, temporary or permanent business closures, errors etc.); this feedback may be used to update information about points of interest in order to provide more accurate or more up-to-date search results in the future. In some embodiments, map service 1030 and/or other service(s) 1050 may provide testing information to the client device (e.g., an A/B test) to determine which search results are best. For instance, at random intervals, the client device may receive and present two search results to a user and allow the user to indicate the best result. The client device may report the test results to map service 1030 and/or other service(s) 1050 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a navigation application for execution by a set of processing units of a device, the navigation application for providing navigation guidance as the device travels a route, the application comprising sets of instructions for:
    as the device travels along the route, providing a navigation presentation that presents navigation maneuvers of the route and a map display area;
    while navigating the route, receiving traffic condition data regarding a traffic condition associated with the route;
    comparing the traffic condition data to a first notification threshold that corresponds to a traffic congestion notification and a second notification threshold that corresponds to a faster route prompt;
    while navigating the route, automatically determining, by the device, that the traffic condition data satisfies the first notification threshold and the second notification threshold; and
    in response to the automatic determination, presenting the faster route prompt and forgoing presentation of the traffic congestion notification.

2. The non-transitory machine readable medium of claim 1,
    wherein a plurality of possible notifications comprises at least two of (i) a traffic-congestion notification relating to traffic congestion along the current route, (ii) a faster-route notification relating to a faster route that can replace the current route, and (iii) a route-obstruction notification regarding a road closure along the current route.

3. The non-transitory machine readable medium of claim 2, wherein the application further comprises sets of instructions for:
    providing an option to take the faster route with the faster-route notification; and
    upon selection of the option, providing the faster route instead of the current route.

4. The non-transitory machine readable medium of claim 2, wherein the application further comprises sets of instructions for:
    determining that a faster route that circumvents the detected traffic condition is not available; and
    providing a traffic-congestion notification to provide notice regarding traffic along the current route.

5. The non-transitory machine readable medium of claim 1, further comprising:
    generating a traffic notification display area;
    based on the determination, presenting a first notification in the traffic notification display area, wherein the traffic notification display area is non-transparent.

6. The non-transitory machine readable medium of claim 5, wherein the traffic notification display area comprises a traffic notification banner, and wherein the application comprises sets of instructions for:
    selecting a type of notification to be provided;
    providing the traffic notification banner with a first appearance when the selected type is the traffic-congestion notification;
    providing the traffic notification banner with a second appearance when the selected type is the faster-route notification; and
    providing the traffic notification banner with a third appearance when the selected type is the route-obstruction notification,
    wherein the first, second and third appearances differ from each other.

7. The non-transitory machine readable medium of claim 6, wherein the first, second and third different appearances are different colors.

8. The non-transitory machine readable medium of claim 6, wherein the first, second and third different appearances are different shapes of the traffic, faster-route, and route-obstruction notification banners.

9. The non-transitory machine readable medium of claim 6, wherein at least one of the traffic notification banners is provided above or below a navigation banner that is provided during the navigation presentation to provide navigation instructions.

10. The non-transitory machine readable medium of claim 1, wherein a first type of traffic notification provides a selectable control for selecting a new route that is not provided by a second type of traffic notification.

11. The non-transitory machine readable medium of claim 1, wherein the application comprises a set of instructions for iteratively monitoring traffic conditions along the route.

12. The non-transitory machine readable medium of claim 11, wherein application further comprises a set of instructions for comparing the monitored traffic conditions to a set of threshold criteria.

13. The non-transitory machine readable medium of claim 11, wherein the monitored traffic conditions comprise expected traffic delays along the route.

14. For a device, a method for providing navigation guidance as the device travels a route, the method comprising:
    as the device travels along the route, providing a navigation presentation that presents navigation maneuvers of the route and a map display area;
    while navigating the route, receiving traffic condition data regarding a traffic condition associated with the route;

comparing the traffic condition data to a first notification threshold that corresponds to a traffic congestion notification and a second notification threshold that corresponds to a faster route prompt;

while navigating the route, automatically determining, by the device, that the traffic condition data satisfies the first notification threshold and the second notification threshold; and in response to the automatic determination, presenting the faster route prompt and forgoing presentation of the traffic congestion notification.

15. The method of claim 14, wherein the route is a current route;

wherein a plurality of possible notifications comprises at least two of (i) a traffic-congestion notification relating to traffic congestion along the current route, (ii) a faster-route notification relating to a faster route that can replace the current route, and (iii) a route-obstruction notification regarding a road closure along the current route.

16. The method of claim 15, wherein the route-obstruction notification is also provided when there is delay along the current route that is greater than a threshold amount.

17. The method of claim 16 further comprising displaying a new route along with the route-obstruction notification.

18. The method of claim 14, further comprising presenting the first notification in a traffic notification.

* * * * *